United States Patent
Nakanishi

(10) Patent No.: US 12,149,668 B2
(45) Date of Patent: Nov. 19, 2024

(54) NON-TRANSITORY COMPUTER-READABLE RECORDING MEDIUM STORING COMPUTER-READABLE INSTRUCTIONS FOR SERVER, AND COMMUNICATION SYSTEM

(71) Applicant: BROTHER KOGYO KABUSHIKI KAISHA, Nagoya (JP)

(72) Inventor: Yuta Nakanishi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/528,004

(22) Filed: Dec. 4, 2023

(65) Prior Publication Data

US 2024/0187540 A1 Jun. 6, 2024

(30) Foreign Application Priority Data

Dec. 5, 2022 (JP) .................. 2022-194355
Sep. 29, 2023 (JP) .................. 2023-170133

(51) Int. Cl.
*H04N 1/34* (2006.01)
*G06F 3/12* (2006.01)

(52) U.S. Cl.
CPC .......... *H04N 1/346* (2013.01); *G06F 3/1203* (2013.01); *G06F 3/1239* (2013.01); *G06F 3/1273* (2013.01); *G06F 3/1286* (2013.01); *G06F 3/1287* (2013.01); *G06F 3/1293* (2013.01)

(58) Field of Classification Search
CPC ..... H04N 1/346; G06F 3/1203; G06F 3/1239; G06F 3/1273; G06F 3/1286; G06F 3/1287; G06F 3/1293
USPC ....................................... 358/1.15
See application file for complete search history.

(56) References Cited

U.S. PATENT DOCUMENTS

| | | | |
|---|---|---|---|
| 2002/0006522 A1* | 1/2002 | Wu | B65D 81/268 428/35.4 |
| 2010/0312721 A1* | 12/2010 | Terada | G07F 17/266 705/400 |
| 2014/0340702 A1* | 11/2014 | Maki | H04N 1/4413 358/1.14 |
| 2017/0063646 A1 | 3/2017 | Kawai | |
| 2018/0101336 A1* | 4/2018 | Onomatsu | G06F 3/1287 |
| 2018/0268493 A1* | 9/2018 | Kamijima | H04N 1/346 |
| 2021/0368047 A1* | 11/2021 | Noguchi | H04N 1/46 |
| 2023/0305768 A1* | 9/2023 | Hirose | G06F 3/1203 |

FOREIGN PATENT DOCUMENTS

JP 2017-049767 A 3/2017

\* cited by examiner

*Primary Examiner* — Negussie Worku
(74) *Attorney, Agent, or Firm* — KENEALY VAIDYA LLP

(57) ABSTRACT

A server may, every time printing information indicating a number of printer print sheets which is a number of sheets printed by the printer is received from the printer, update non-charged sheet information in a memory within a range that does not exceed upper limit number of print sheets and, in a case where a sheet information request including the printer identification information is received from a terminal device, send to the terminal device related sheet information related to non-charged sheet information in the memory.

17 Claims, 13 Drawing Sheets

FIG. 2

User Table 238

| User Name | Password | Serial Number | Token | Address Information | Payment Information |
|---|---|---|---|---|---|
| U1 | PW1 | SN1 | tk1 | AD1 | PI1 |
| ... | ... | ... | ... | ... | ... |

Benefit Table 240

| Benefit Code | Number of Benefit Print Sheets | Time Limit |
|---|---|---|
| AAA | BI1(200 sheets) | 2022/11/30 23:59 |
| BBB | BI2(400 sheets) | 2022/12/15 00:00 |
| ... | ... | ... |

Management Table 242

| Serial Number | Total Number of Print Sheets (First, Second Embodiment) | Benefit Information (First, Second Embodiment) | | | Number of Excess Print Sheets | Number of Carryover Print Sheets | Number of Contracted Print Sheets |
|---|---|---|---|---|---|---|---|
| | | Number of Non-charged Print Sheets | Upper Limit Number of Print Sheets | Time Limit | | | |
| SN1 | 100 | 100 | 200 | 2022/11/30 23:59 | 0 | 0 | 1000 |
| ... | ... | ... | ... | ... | ... | ... | ... |

← MI1

Management Information (Case B)

FIG. 5
(Case C)

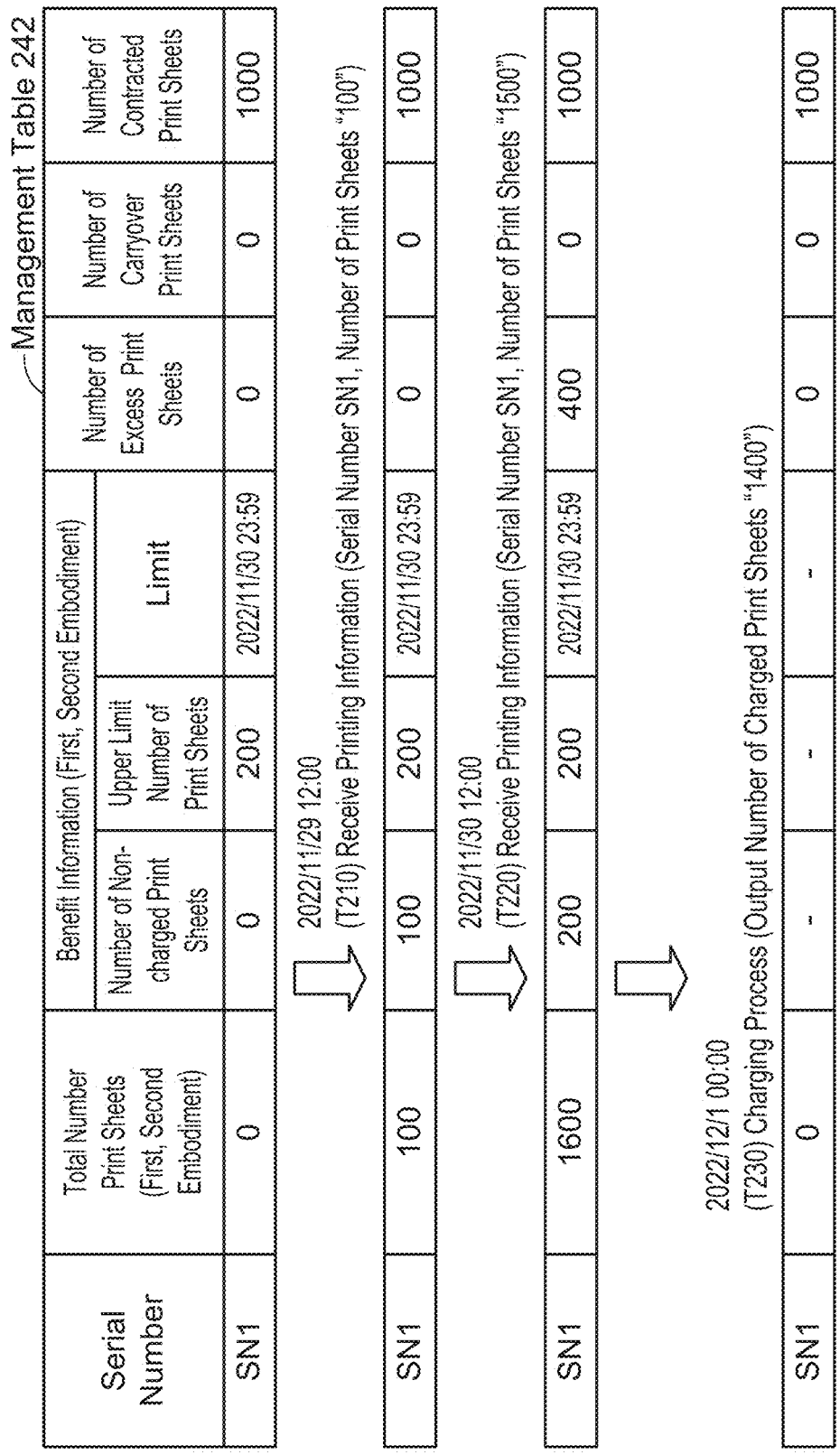

| Serial Number | Total Number Print Sheets (First, Second Embodiment) | Benefit Information (First, Second Embodiment) | | | Number of Excess Print Sheets | Number of Carryover Print Sheets | Number of Contracted Print Sheets |
| --- | --- | --- | --- | --- | --- | --- | --- |
| | | Number of Non-charged Print Sheets | Upper Limit Number of Print Sheets | Limit | | | |
| SN1 | 0 | 0 | 200 | 2022/11/30 23:59 | 0 | 0 | 1000 |

⇩ 2022/11/29 12:00
(T210) Receive Printing Information (Serial Number SN1, Number of Print Sheets "100")

| SN1 | 100 | 100 | 200 | 2022/11/30 23:59 | 0 | 0 | 1000 |

⇩ 2022/11/30 12:00
(T220) Receive Printing Information (Serial Number SN1, Number of Print Sheets "1500")

| SN1 | 1600 | 200 | 200 | 2022/11/30 23:59 | 400 | 0 | 1000 |

⇩ 2022/12/1 00:00
(T230) Charging Process (Output Number of Charged Print Sheets "1400")

| SN1 | 0 | - | - | - | 0 | 0 | 1000 |

Management Table 242

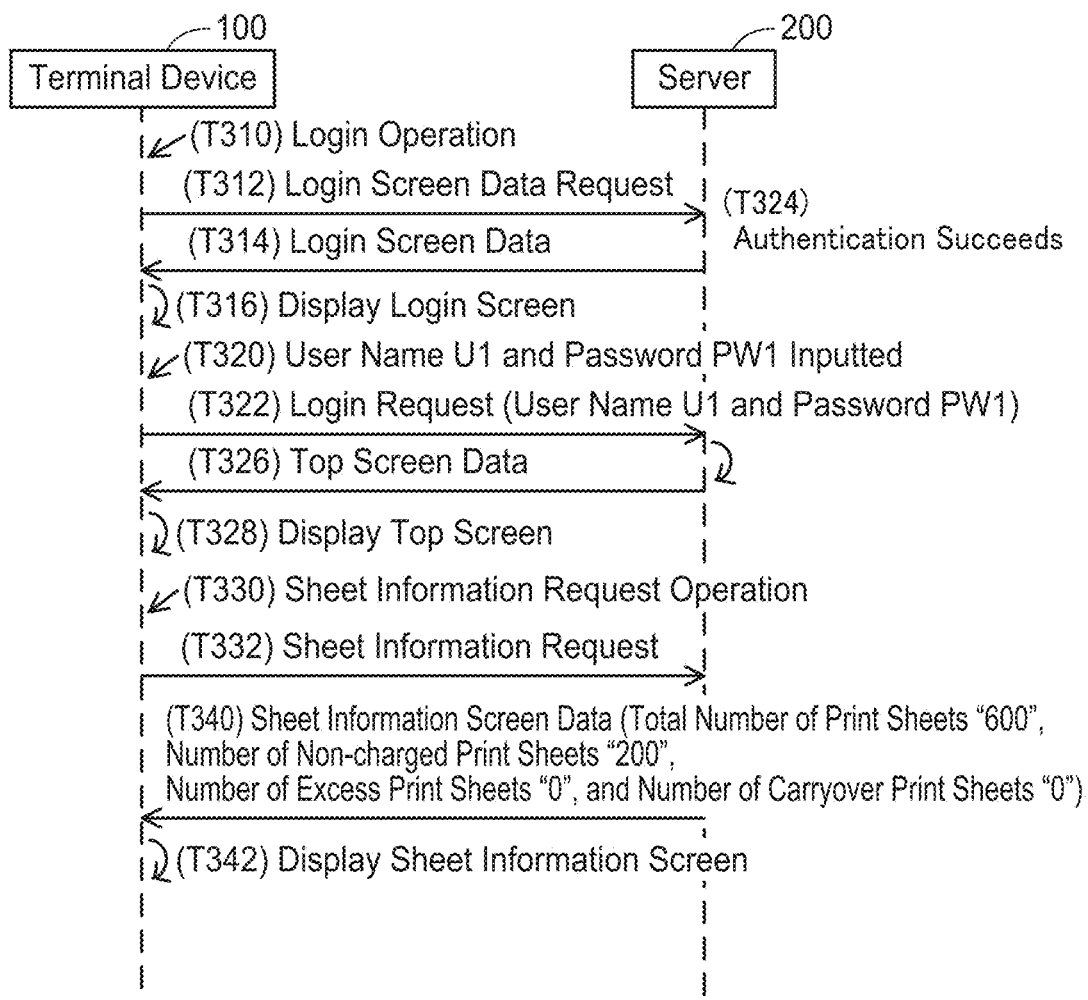

FIG. 7

(Second Embodiment)

| Serial Number | Total Number of Print Sheets (First, Second Embodiment) | Benefit Information (First, Second Embodiment) | | | Number of Excess Print Sheets | Number of Carryover Print Sheets | Number of Contracted Print Sheets |
|---|---|---|---|---|---|---|---|
| | | Number of Remaining Print Sheets | Upper Limit Number of Print Sheets | Time Limit | | | |
| SN1 | 0 | 200 | 200 | 2022/11/30 23:59 | 0 | 0 | 1000 |
| ... | ... | ... | ... | ... | ... | ... | ... |

Management Table 242

MI11

FIG. 8
(Second Embodiment) (Case E)

Management Table 242

| Serial Number | Total Number of Print Sheets (First, Second Embodiment) | Benefit Information (First, Second Embodiment) | | | Number of Excess Print Sheets | Number of Carryover Print Sheets | Number of Contracted Print Sheets |
|---|---|---|---|---|---|---|---|
| | | Number of Remaining Print Sheets | Upper Limit Number of Print Sheets | Time Limit | | | |
| SN1 | 0 | 200 | 200 | 2022/11/30 23:59 | 0 | 0 | 1000 |

2022/11/29 12:00
(T410) Receive Printing Information (Serial Number SN1, Number of Print Sheets "100")

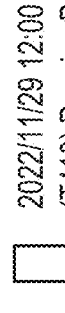

| SN1 | 100 | 100 | 200 | 2022/11/30 23:59 | 0 | 0 | 1000 |

2022/11/30 12:00
(T420) Receive Printing Information (Serial Number SN1, Number of Print Sheets "500")

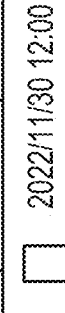

| SN1 | 600 | 0 | 200 | 2022/11/30 23:59 | 0 | 0 | 1000 |

2022/12/1 00:00
(T430) Charging Process (Output Number of Charged Print Sheets "400")

| SN1 | 0 | - | - | - | 0 | 600 | 1000 |

FIG. 9
(Second Embodiment) (Case F)

Management Table 242

| Serial Number | Total Number of Print Sheets (First, Second Embodiment) | Benefit Information (First, Second Embodiment) | | | Number of Excess Print Sheets | Number of Carryover Print Sheets | Number of Contracted Print Sheets |
|---|---|---|---|---|---|---|---|
| | | Number of Remaining Print Sheets | Upper Limit Number of Print Sheets | Time Limit | | | |
| SN1 | 0 | 200 | 200 | 2022/11/30 23:59 | 0 | 0 | 1000 |

2022/11/29 12:00
(T510) Receive Printing Information (Serial Number SN1, Number of Print Sheets "100")

| SN1 | 100 | 100 | 200 | 2022/11/30 23:59 | 0 | 0 | 1000 |

2022/11/30 12:00
(T520) Receive Printing Information (Serial Number SN1, Number of Print Sheets "1500")

| SN1 | 1600 | 0 | 200 | 2022/11/30 23:59 | 400 | 0 | 1000 |

2022/12/1 00:00
(T530) Charging Process (Output Number of Charged Print Sheets "1400")

| SN1 | 0 | - | - | - | 0 | 0 | 1000 |

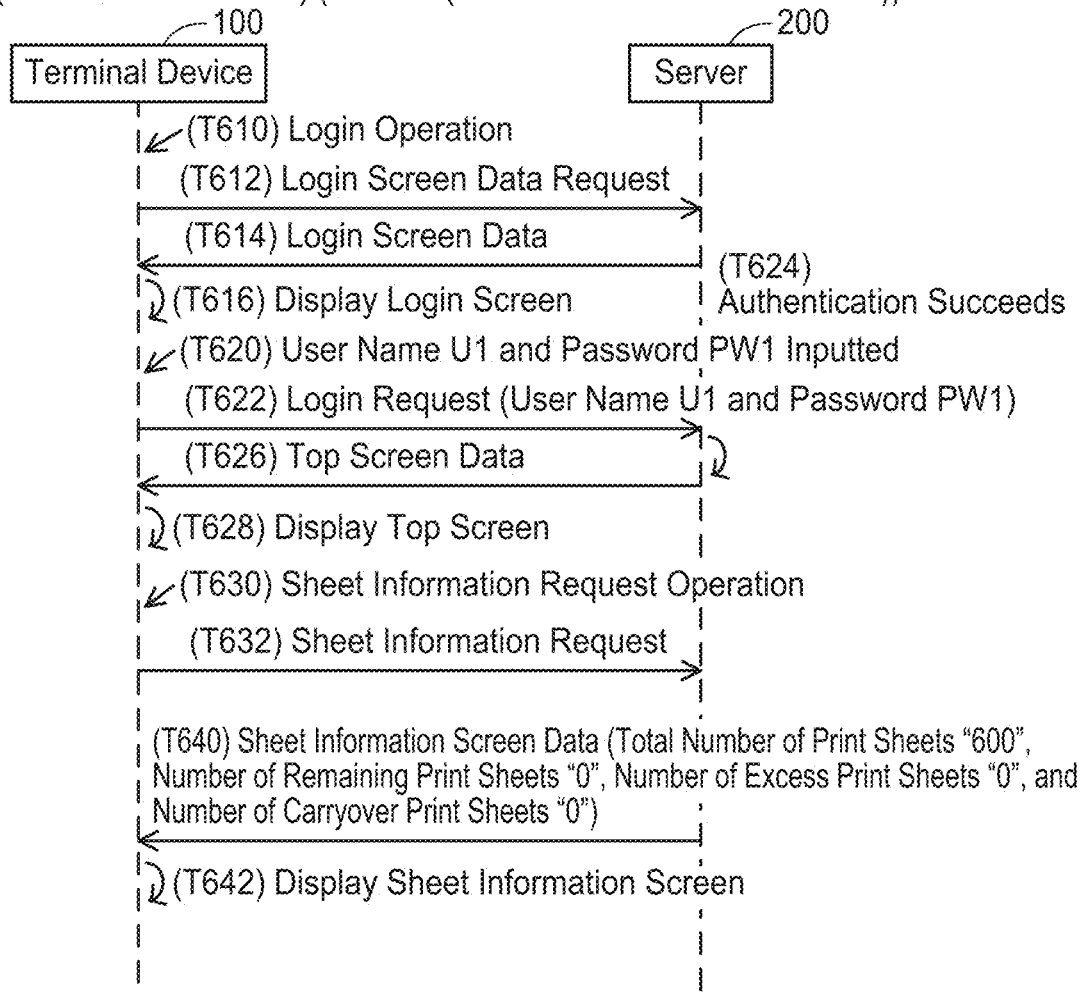

FIG. 11

(Third, Fourth Embodiment)

| Total Number of Print Sheets | Benefit Information | | | |
|---|---|---|---|---|
| | Number of Non-charged Print Sheets (Third Embodiment) | Number of Remaining Print Sheets (Fourth Embodiment) | Upper Limit Number of Print Sheets | Time Limit |
| 100 | 100 | 100 | 200 | 2022/11/30 23:59 |
| ... | ... | ... | ... | ... |

Sheet Table 40

NON-TRANSITORY COMPUTER-READABLE RECORDING MEDIUM STORING COMPUTER-READABLE INSTRUCTIONS FOR SERVER, AND COMMUNICATION SYSTEM

REFERENCE TO RELATED APPLICATIONS

This application claims priority from Japanese Patent Application No. 2022-194355 filed on Dec. 5, 2022, and Japanese Patent Application No. 2023-170133 filed on Sep. 29, 2023. The entire contents of the priority applications are incorporated herein by reference.

BACKGROUND ART

A communication system including a printer, a PC, and an information management server is known. The printer stores printing information concerning the number of print sheets and sends the printing information to the information management server each time a flat-rate printing process is executed. When the information management server receives the printing information from the printer, it manages the printing information. The information management server uses the printing information received from the printer to provide a service of the flat-rate printing process.

SUMMARY

This disclosure discloses art that improves user convenience.

The disclosure discloses a non-transitory computer-readable recording medium storing computer-readable instructions for a server. The server may be configured to provide a service to charge a user of a printer a fee depending on a number of sheets of print media printed by the printer. The server may comprise: a memory configured to store printer identification information for identifying the printer and sheet information of the printer in a specific period in association with each other, the sheet information includes upper limit sheet information indicating an upper limit number of print sheet for which the fee is not charged and non-charged sheet information indicating a number of non-charged print sheets for which the fee is not charged; and a processor, wherein the computer-readable instructions, when executed by the processor, cause the server to: every time printing information indicating a number of printer print sheets which is a number of sheets printed by the printer is received from the printer, update the non-charged sheet information in the memory within a range that does not exceed the upper limit number of print sheets, the number of printer print sheets being a number of sheets of the print media used for the printing by the printer from when previous printing information is sent to the server until when present printing information is sent to the server; and in a case where a sheet information request including the printer identification information is received from a terminal device, send to the terminal device related sheet information related to the non-charged sheet information in the memory.

According to the above configuration, when the server receives the sheet information request from the terminal device, the server sends the related sheet information to the terminal device. Therefore, the user of the terminal device can see the related sheet information. Thus, user convenience is improved.

Further, the disclosure discloses another non-transitory computer-readable recording medium storing computer-readable instructions for a server. The server may be configured to provide a service to charge a user of a printer a fee depending on a number of sheets of print media printed by the printer. The server may comprise: a memory configured to store printer identification information for identifying the printer and sheet information of the printer in a specific period in association with each other, the sheet information includes remaining sheet information indicating a number of remaining print sheets for which the fee is not charged; and a processor, wherein the computer-readable instructions, when executed by the processor, cause the server to: every time printing information indicating a number of printer print sheets which is a number of sheets printed by the printer is received from the printer, update the remaining sheet information in the memory within a range that does not decrease the number of remaining print sheets to below zero, the number of printer print sheets being a number of sheets of the print media used for the printing by the printer from when previous printer printing information is sent to the server until when present printer printing information is sent to the server; and in a case where a sheet information request including the printer identification information is received from a terminal device, send to the terminal device the remaining sheet information in the memory.

According to the above configuration, when the server receives the sheet information request from the terminal device, the server sends the remaining sheet information to the terminal device. Therefore, the user of the terminal device can see the remaining sheet information. Thus, user convenience is improved.

Further, the disclosure discloses a communication system comprising a printer and a server. The server may be configured to provide a service to charge a user of a printer a fee depending on a number of sheets of print media printed by the printer. The printer may comprise: a printer memory configured to store sheet information of the printer in a specific period, the sheet information including upper limit sheet information indicating an upper limit number of print sheets for which the fee is not charged and non-charged sheet information indicating a number of non-charged print sheets for which the fee is not charged; and a controller configured to: every time printing is executed, update the non-charged sheet information in the printer memory within a range that does not exceed the upper limit number of print sheets; and send the non-charged sheet information and printer identification information for identifying the printer to the server. The server may comprise: a controller configured to: receive the non-charged sheet information and the printer identification information from the printer; and in a case where a sheet information request including the printer identification information is received from a terminal device, send to the terminal device related sheet information related to the received non-charged sheet information.

According to the above configuration, when the server receives the sheet information request from the terminal device, the server sends the related sheet information to the terminal device. Therefore, the user of the terminal device can see the related sheet information. Thus, user convenience is improved.

Further, the disclosure discloses another communication system comprising a printer and a server. The server may be configured to provide a service to charge a user of the printer a fee depending on a number of print media printed by the printer. The printer may comprise: a printer memory configured to store sheet information of the printer in a specific period, the sheet information includes remaining sheet information indicating a number of remaining print sheets for which the fee is not charged; and a controller configured to: every time printing is executed, update the remaining sheet information in the memory within a range that does not decrease the number of remaining print sheets to below zero; and send the remaining sheet information and printer identification information for identifying the printer to the server. The server may comprise: a controller configured to: receive the remaining sheet information and the printer identification information from the printer; and in a case where a sheet information request including the printer identification information is received from a terminal device, send to the terminal device the received remaining sheet information.

According to the above configuration, when the server receives the sheet information request from the terminal device, the server sends the remaining sheet information to the terminal device. Therefore, the user of the terminal device can see the remaining sheet information. Thus, user convenience is improved.

A non-transitory computer-readable recording medium storing the above computer-readable instructions, a server realized by the above computer-readable instructions, and a method executed by the server are also novel and useful. Further, a communication system including the server, the printer, and the terminal device is also novel and useful.

BRIEF DESCRIPTION OF DRAWINGS

FIG. 2 shows examples of tables.

FIG. 5 shows a sequence diagram of Case C in which the total number of print sheets when the charging process is executed exceeds the number of contracted print sheets.

FIG. 6 shows a sequence diagram of Case D in which sheet information screen is displayed on a terminal device.

FIG. 7 shows an example of a management table of a second embodiment.

FIG. 8 shows a sequence diagram of Case E in which the total number of print sheets when the charging process is executed is less than the number of contracted print sheets in the second embodiment.

FIG. 9 shows a sequence diagram of Case F in which the total number of print sheets when the charging process is executed exceeds the number of contracted print sheets in the second embodiment.

FIG. 10 shows a sequence diagram of Case G in which the sheet information screen is displayed on the terminal device in the second embodiment.

FIG. 11 shows an example of a sheet table of third and fourth embodiments.

DESCRIPTION

Figure 1:
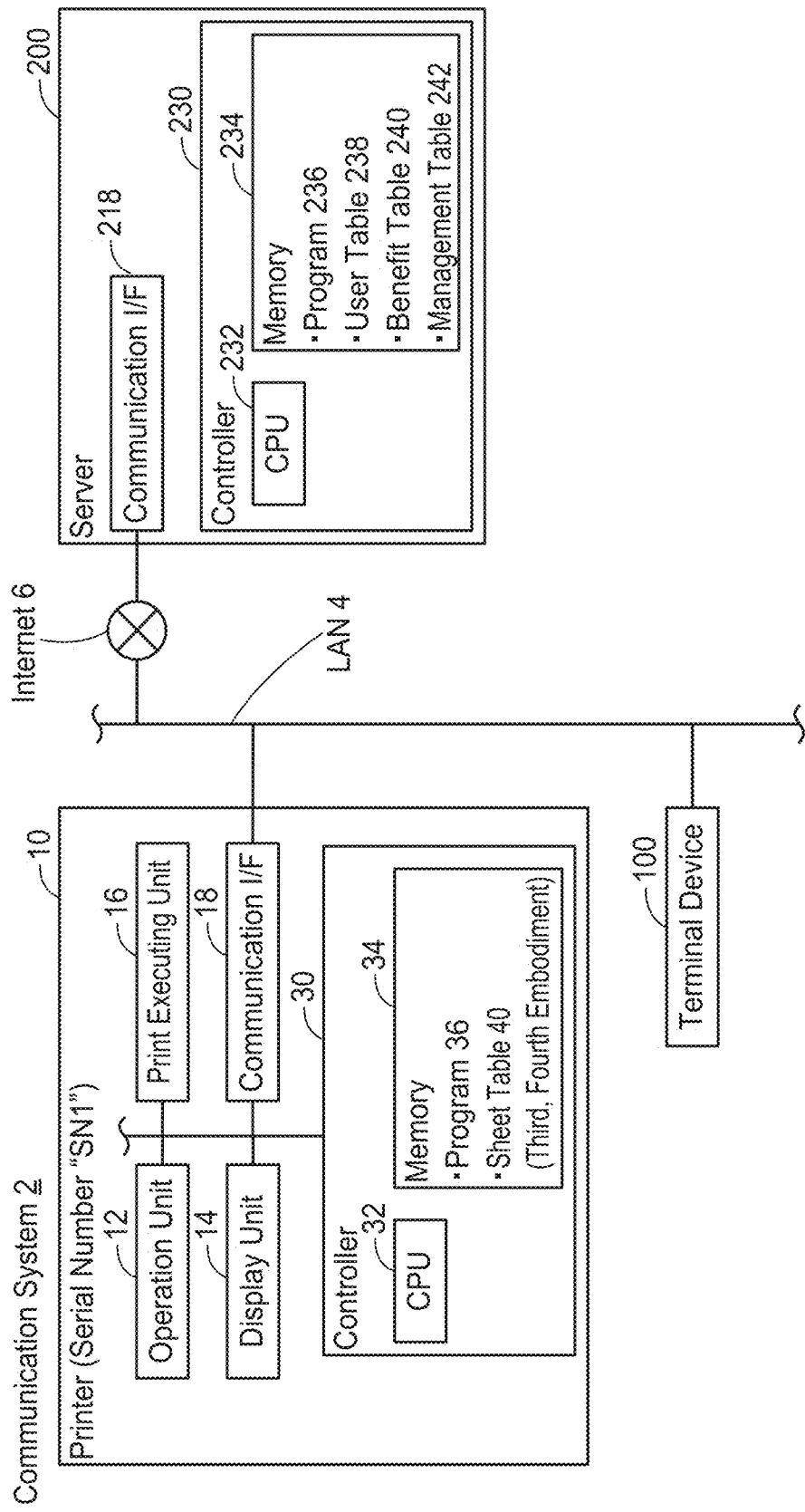
FIG. 1 shows a structure of a communication system.

First Embodiment (Configuration of Communication System 2; FIG. 1)

As shown in FIG. 1, a communication system 2 includes a printer 10, a terminal device 100, and a server 200. The terminal device 100 is a portable terminal device such as a cell phone (e.g., smartphone), a PDA, or a tablet PC. The printer 10 and the terminal device 100 are connected to a Local Area Network (LAN) 4. The printer 10 and the terminal device 100 can communicate via the LAN 4. The LAN 4 is connected to the Internet 6. The printer 10, the terminal device 100, and the server 200 are connected to the Internet 6. The printer 10, the terminal device 100, and the server 200 can communicate via the Internet 6. The server 200 provides a service that charges a user of the printer a fee depending on the number of print media printed by the printer. Specifically, the server 200 provides a flat-rate charging service for the printer (hereinafter referred to as "flat-rate service"). The flat-rate service will be described in detail later.

(Configuration of Printer 10)

The printer 10 is a peripheral device configured to execute a printing function (i.e., a peripheral device of, for example, a PC). The printer 10 may be a multifunctional device configured to execute a scanning function, a facsimile function, and the like, in addition to the printing function. The printer 10 includes an operation unit 12, a display unit 14, a print execution unit 16, a communication interface 18, and a controller 30. The printer 10 has a serial number SN1. The serial number is an identification number assigned at the time of manufacture of the printer and is information for identifying this printer. In the following, the interface may be described as "I/F".

The operation unit 12 includes a plurality of keys. The user can input various instructions to the printer 10 by operating the operation unit 12. The display unit 14 is a display for showing various information. The print execution unit 16 includes a printing mechanism of an inkjet scheme, laser scheme, or the like.

The communication I/F 18 is connected to the LAN 4. The communication I/F 18 may be a wireless I/F or a wired I/F.

The controller 30 includes a CPU 32 and a memory 34. The CPU 32 executes various processes in accordance with a program 36 stored in the memory 34. The memory 34 is configured of a volatile memory, a nonvolatile memory, and the like.

(Configuration of Server 200)

The server 200 is installed on the Internet 6 by a vendor of the printer 10. In a modification, the server 200 may be installed on the Internet 6 by a different provider than this vendor. In another modification, the vendor of the printer 10 may not prepare hardware of the server 200 on its own, but may use an environment provided by an external cloud computing service. In this case, the vendor of the printer 10 may prepare a program (i.e., software) for the server 200 and implement the server 200 by installing it in the above environment. As described above, the server 200 provides the flat-rate service. The flat-rate service charges a predetermined amount of fee (which hereinafter may be referred to as the "flat-rate fee") when the number of print sheets printed by the printer 10 in a specific period (e.g., one month) is equal to or less than a number of contracted print sheets (e.g., 1,000 sheets), while when the number of print sheets printed by the printer 10 in the specific period exceeds the number of contracted print sheets, the service charges a fee that is the sum of the flat-rate fee and an excess fee corresponding to the number of print sheets printed in excess of the number of contracted print sheets. The flat-rate service includes an automatic ordering service. The automatic ordering service is a service which automatically orders a new dedicated cartridge when an amount of ink remaining in the dedicated cartridge attached to the print execution unit 16 of the printer 10 becomes equal to or lower than a predetermined amount. The dedicated cartridge is a cartridge shipped from the server 200 and is only available when the printer is receiving the flat-rate service. In a modification, the server 200 may provide a pay-per-print charging service that charges a fee depending on the number of sheets printed by the printer 10 in a specific period (e.g., one month) instead of the flat-rate service.

The server 200 includes a communication I/F 218 and a controller 230. The communication I/F 218 is connected to the Internet 6. The controller 230 includes a CPU 232 and a memory 234. The CPU 232 executes various processes according to a program 236 stored in the memory 234. The memory 234 is configured of a volatile memory, a nonvolatile memory, and the like. The memory 234 further stores a user table 238, a benefit table 240, and a management table 242.

(Configurations of Tables; FIG. 2)

Referring to FIG. 2, the contents of the user table 238, the benefit table 240, and management table 242 in the server 200 will be described.

The user table 238 is a table for managing information about a user. In the user table 238, a username (e.g., U1) to identify the user, a password (e.g., PW1), a serial number (e.g., SN1), a token (e.g., tk1), address information (e.g., AD1) indicating an address of the user, and payment information (e.g., PI1) are stored in association with each other. The token is authentication information for establishing an XMPP connection (extensible Messaging and Presence Protocol) between the printer 10 and the server 200. The payment information is information about a payer of the fee (e.g., credit card number).

The benefit table 240 is a table for managing the contents of a benefit granted to a user. In the benefit table 240, a benefit code (e.g., AAA, BBB), benefit sheet information (e.g., BI1, BI2), and time limit information (e.g., "11/30/2022 23:59" and "12/15/2022 00:00") are stored in association with each other. The benefit code is a coupon code distributed to the user. The benefit code is distributed to the user by the server 200. The benefit sheet information BI1 and BI2 indicate benefits to be granted to the user. Specifically, the benefit sheet information BI1 and BI2 are information indicating the upper limit number of print sheets for which the fee is not charged. The time limit information indicates the time limit to which the benefit information can be used.

The management table 242 is a table for managing information related to the number of print sheets. In the management table 242, a serial number, total sheet information, benefit information, excess sheet information, carryover sheet information, and contract sheet information are stored in association with each other. The contract sheet information indicates the number of contracted print sheets. The total sheet information indicates the total number of print sheets printed by the printer in a specific period. The benefit information includes non-charged sheet information, upper limit sheet information, and time limit information. The non-charged sheet information indicates the number of print sheets for which the fee is not charged (hereinafter referred to as "the number of non-charged of print sheets"). The non-charged sheet information also indicates the number of print sheets that is classified as the number of benefit print sheets. The upper limit sheet information indicates the upper limit number of the non-charged print sheets (hereinafter referred to as "the upper limit number of print sheets"). The upper limit sheet information and the time limit information in the benefit information correspond to the benefit sheet information and the time limit information in the benefit table 240, respectively. The excess sheet information indicates the number of sheets printed in excess of the number of contracted print sheets in a specific period of time (hereinafter referred to as "the number of excess print sheets"). The carryover sheet information indicates the number of print sheets that were not used during the specific period in the past (hereinafter referred to as "the number of carryover print sheets"). In the following, the information in the management table 242 may be collectively referred to as "management information".

(Specific Cases; FIGS. 3 to 6)

With reference to FIGS. 3 to 6, specific Cases A through D realized by the communication system 2 of the present embodiment will be described. In the following descriptions, for easier understanding, operations executed by CPUs (for example, the CPUs 32, 232) of devices will be described with the devices (for example, the printer 10, the server 200) as a subject of action instead of describing the CPUs as the subject of action. Further, all the communication executed by the printer 10 is executed via the communication I/F 18, and the communication executed by the server 200 is executed via the communication I/F 218. Accordingly, in the following, a phrase "via a communication I/F" will be omitted when the communication is described.

Figure 3:
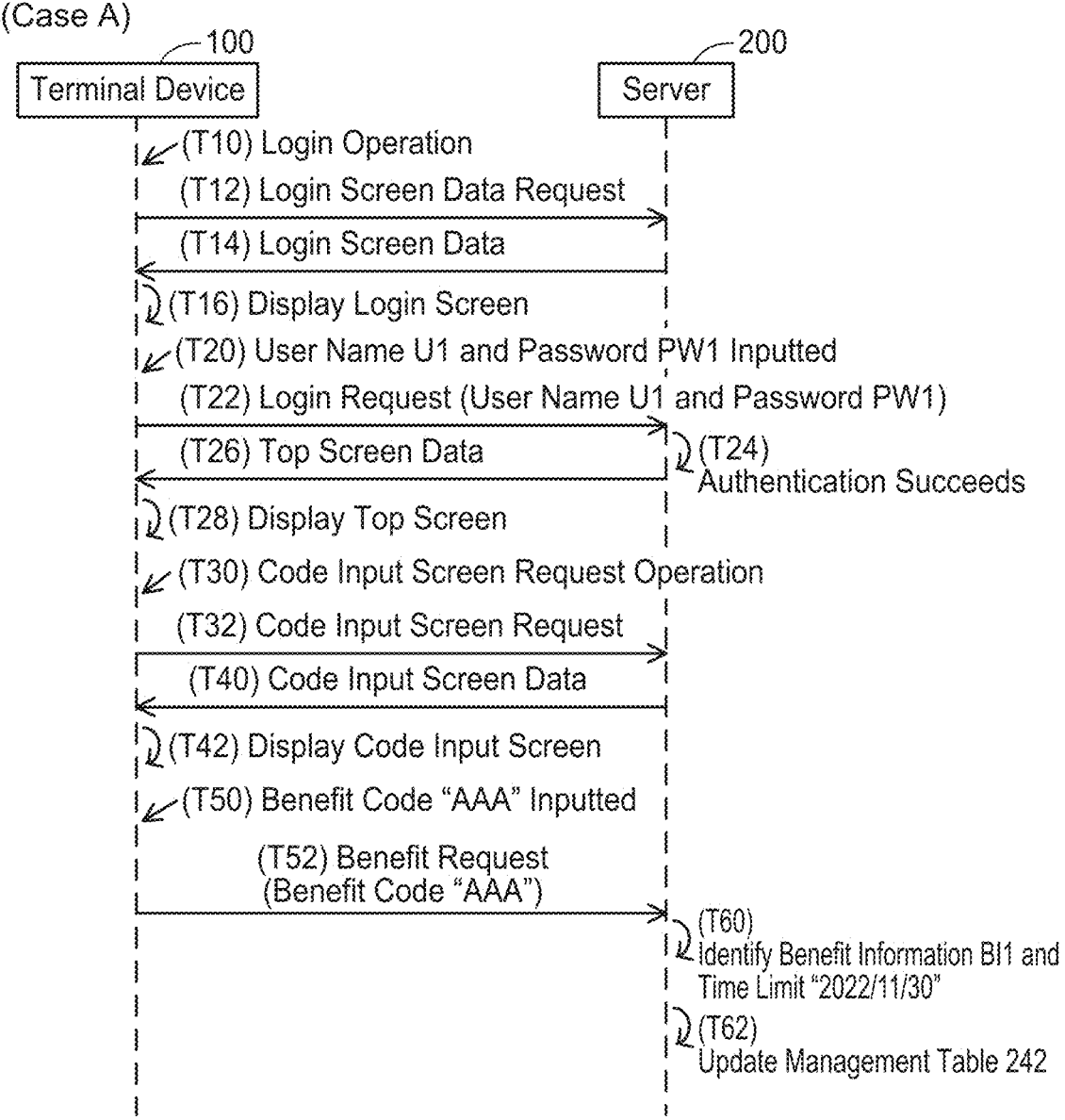
FIG. 3 shows a sequence diagram of Case A in which a benefit is granted to a user.

(Case A; FIG. 3)

Referring to FIG. 3, Case A in which a benefit is granted to a user will be described. The initial state of Case A is immediately after the user of the printer 10 subscribes to the flat-rate service. Therefore, the username U1, the password PW1, the serial number SN1, the token tk1, the address information AD1, and the payment information PI1 are stored in the user table 238 of the server 200 in association with each other. In the management table 242 of the server 200, the serial number SN1 and the contract sheet information "1000" are stored. In the management table 242, "0" is stored in the total sheet information, the non-charged sheet information, the upper limit sheet information, the excess sheet information, and the carryover sheet information, and the time limit information is empty. In addition, in the benefit table 240 of the server 200, the benefit code "AAA", the benefit sheet information BI1 "200", and the time limit information "2022/11/30 23:59" are stored in association with each other. An XMPP connection is established between the printer 10 and the server 200. The XMPP connection is a so-called always-on connection, which remains established until the printer 10 is turned off. Using the XMPP connection, the server 200 can send a request to the printer 10 across the firewall of the LAN 4 to which the printer 10 belongs, without receiving a request from the printer 10. A mechanism for sending a request from the server 200 to the printer 10 may not be the XMPP connection but may be another method. For example, a Hypertext Transfer Protocol Secure (HTTPS) connection may be established between the printer 10 and the server 200. The printer 10 periodically sends, to the server 200, printing information including the serial number SN1 and the printer sheet information indicating the number of printer print sheets, which is the number of print sheets printed by the printer 10 (see T110 in FIG. 4). In the present embodiment, the printer 10 sends the printing information to the server 200 every 24 hours. That is, the number of printer print sheets is the number of sheets of print media used for printing by the printer 10 from when the previous printing information is sent to the server 200 until when the present printing information is sent to the server 200.

The terminal device 100 accepts a login operation at T10, sends a login screen data request to the server 200 at T12, receives login screen data from the server 200 at T14, and displays a login screen at T16. When the terminal device 100 accepts input of the username U1 and the password PW1 at T20, the terminal device 100 sends a login request including the username U1 and password PW1 to the server 200 at T22.

When the server 200 receives the login request from the terminal device 100 at T22, the server 200 determines at T24 that the authentication was successful because the combination of the username U1 and the password PW1 in the login request is stored in user table 238, and at T26, the server 200 sends top screen data to the terminal device 100.

When the terminal device 100 receives the top screen data from the server 200 at T26, the terminal device 100 displays a top screen corresponding to the top screen data at T28. The top screen is, for example, a screen for requesting a code input screen for inputting a benefit code. When the terminal device 100 accepts a code input screen request operation requesting to send code input screen data at T30, and the terminal device 100 sends a code input screen request to the server 200 at T32, receives the code input screen data from the server 200 at T40, and displays a code input screen represented by the code input screen data at T42. The code input screen includes a benefit code input field and the like. When the terminal device 100 accepts input of the benefit code "AAA" at T50, the terminal device 100 sends a benefit request including the benefit code "AAA" to the server 200 at T52.

When the server 200 receives the benefit request from the terminal device 100 at T52, the server 200 identifies in the benefit table 240 the benefit sheet information BI1 "200" and the time limit information "2022/11/30 23:59" associated with the benefit code "AAA" in the benefit request at T60. At T62, the server 200 updates the management table 242. Specifically, in the user table 238, the server 200 identifies the serial number SN1 associated with the username U1 of the logged-in user. Next, the server 200 stores, in the management table 242, the number of benefit print sheets "200" represented by the benefit sheet information BI1 as the upper limit number of print sheets in association with the identified serial number SN1. The server 200 also stores, in the management table 242, the time limit "2022/11/30 23:59" represented by the identified time limit information as the time limit information in association with the identified serial number SN1.

Figure 4:
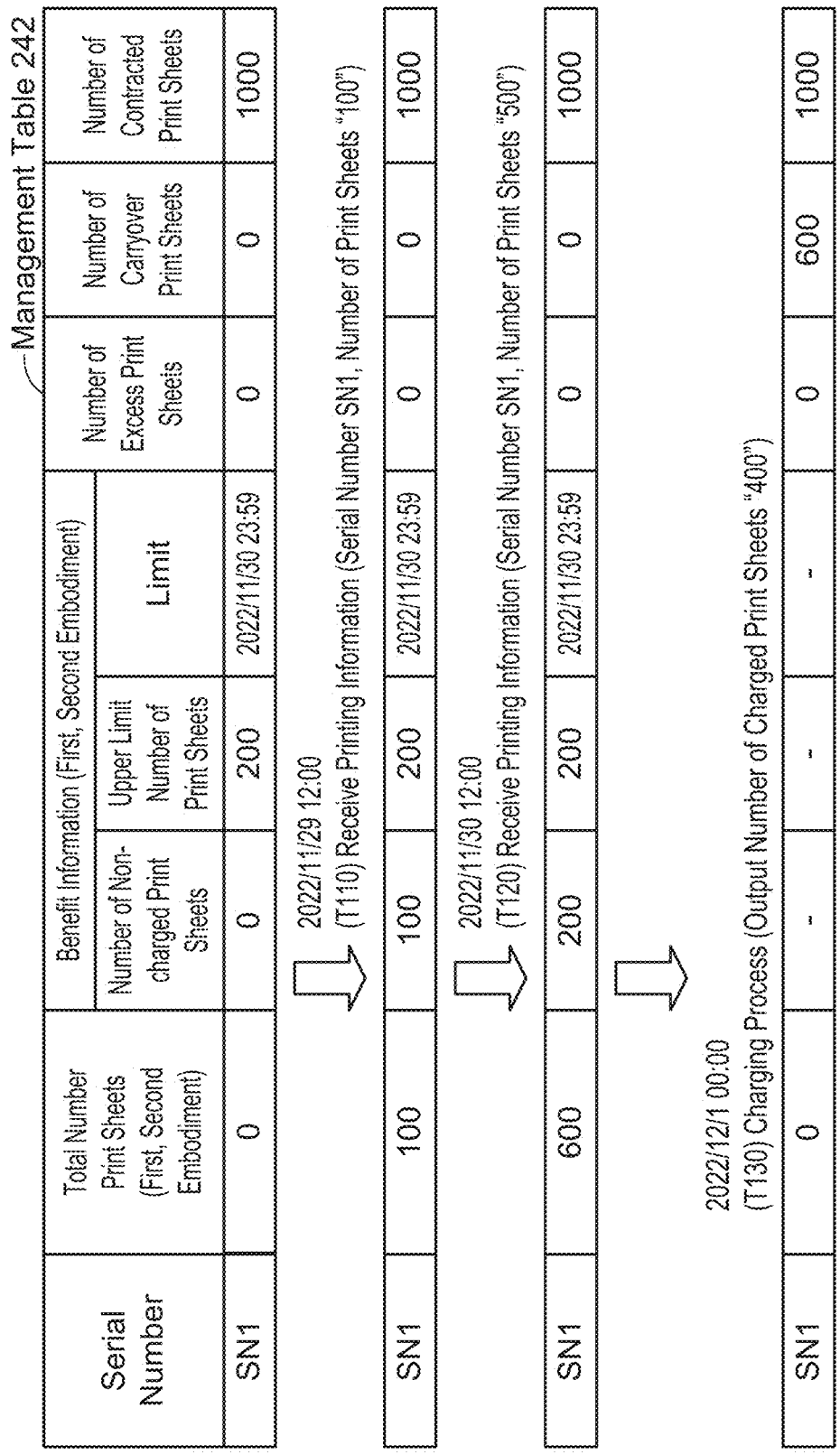
FIG. 4 shows a sequence diagram of Case B in which a total number of print sheets when a charging process is executed is less than a number of contracted print sheets.

(Case B; FIG. 4)

Referring to FIG. 4, Case B in which the total number of print sheets when the charging process is executed is less than the number of contracted print sheets will be described. The initial state of Case B is the state after Case A in FIG. 3. That is, the serial number SN1, the total sheet information "0", the non-charged sheet information "0", the upper limit sheet information "200", the time limit information "2022/11/30 23:59", the excess sheet information "0", the carryover sheet information "0", and the contract sheet information "1000" are stored in the management table 242 in association with each other.

The server 200 receives the printing information including the serial number SN1 and the printer print sheet information "100" from the printer 10 at T110. The current date and time at T110 is "2022/11/29 12:00". In the management table 242, the server 200 identifies management information MI1 including the serial number SN1 in the printing information and executes a first update process to update the management information MI1 by using the number of printer print sheets "100" represented by the printer print sheet information in the printing information. First, the server 200 adds the number of printer print sheets "100" to the total number of print sheets represented by the total sheet information "0" in the management information MI1. Next, the server 200 identifies the time limit "2022/11/30 11:59" represented by the time limit information in the management information MI1, determines that the current date and time "2022/11/29 12:00" is not past the time limit "2022/11/30 11:59," and executes a process to update the non-charged sheet information in the management information MI1. The server 200 calculates the added number of print sheets "100" by adding the number of printer print sheets "100" to the number of non-charged print sheets "0" represented by the non-charged sheet information, and determines whether the added number of print sheets "100" exceeds the upper limit number of print sheets "200" represented by the upper limit sheet information in the management information MI1. The server 200 determines that the added number of print sheets "100" does not exceed the upper limit number of print sheets "200", and stores the added number of print sheets "100" as the non-charged sheet information. When the current date and time is past the time limit "2022/12/1 00:00", the server 200 does not execute the process to update the non-charged sheet information. Next, the server 200 calculates the number of charged print sheets by subtracting the number of non-charged print sheets "100" and the number of carryover print sheets "0" represented by the carryover sheet information in the management information MI1 from the total number of print sheets "100" to determine whether the number of charged print sheets "0" exceeds the number of contracted print sheets "1000" represented by the contract sheet information. The server 200 determines that the number of charged print sheets "0" does not exceed the number of contracted print sheets "1000". In this case, the server 200 does not update the excess sheet information in the management information MI1. When the server 200 determines that the number of charged print sheets exceeds the number of contracted print sheets, the server 200 updates the excess sheet information in the management information MI1. This process will be explained in detail later. As described above, the server 200 updates the management information MI1 every time the printing information is received.

At T120, the server 200 receives the printing information including the serial number SN1 and the number of print sheets "500" from the printer 10. The current date and time at T120 is "2022/11/30 12:00". In this case, the server 200 executes the first update process. The server 200 adds the number of printer print sheets "500" to the total number of print sheets "100". Next, the server 200 determines that the current date and time "2022/11/30 12:00" is not past the time limit "2022/11/30 23:59" and updates the non-charged sheet information. The server 200 calculates the added number of print sheets "600" by adding the number of printer print sheets "500" to the number of non-charged print sheets "100", and determines that the added number of print sheets "600" exceeds the upper limit of print sheets "200". In this case, the server 200 stores the upper limit number of print sheets "200" as the non-charged sheet information. In this way, the server 200 updates the non-charged sheet information within a range that does not exceed the upper limit number of print sheets "200". Next, the server 200 calculates the number of charged print sheets "400" by subtracting the number of non-charged print sheets "200" and the number of carryover print sheets "0" from the total number of print sheets "600", and determines that the number of charged print sheets "400" does not exceed the number of contracted print sheets "1000". In this case, the server 200 does not execute the process to update the excess sheet information.

When the current date and time becomes "2022/12/1 00:00", the server 200 executes the charging process using the management information MI1 in the management table 242 at T130. The charging process includes a process to output the number of charged print sheets and a process to update the management information MI1. First, the server 200 executes the process to output the number of charged print sheets. Specifically, the server 200 calculates the number of charged print sheets "400" by subtracting the number of non-charged print sheets "200" and the number of carryover print sheets "0" from the total number of print sheets "600". The server 200 then outputs the number of charged print sheets "400". The administrator of the server 200 then determines a fee which the user is charged by using the outputted number of charged print sheets "400". In this case, the administrator executes a process to charge the flat-rate fee because the number of charged print sheets "400" is less than or equal to the number of contracted print sheets "1000". The server 200 may execute at least one of the process to determine the fee to be charged and the process to charge the flat-rate fee. In this case, the server 200 executes the process to charge the flat-rate fee by using the payment information PI1 in the user table 238.

Next, the server 200 executes the first update process. The server 200 resets the total number of print sheets in the management information MI1. Since the current date and time "2022/12/1 00:00" is past the time limit "2022/11/30 23:59", the server 200 deletes the benefit information including the time limit information indicating the time limit "2022/11/30 23:59" from the management information MI1. Since the number of charged print sheets "400" is less than the number of contracted print sheets "1000", the server 200 stores the number of print sheets "600", which is the number of sheets obtained by subtracting the number of charged print sheets "400" from the number of contracted print sheets "1000", in the management information MI1 as the carryover sheet information. When the number of non-charged print sheets has not reached the upper limit number of print sheets and the current date and time is not past the time limit, the server 200 stores the number of print sheets obtained by subtracting the number of non-charged print sheets from the upper limit number of print sheets in the management table 242 as the new upper limit sheet information and resets the non-charged sheet information.

As described above, the server 200 outputs the number of print sheets obtained by subtracting the number of non-charged print sheets from the total number of print sheets as the number of charged print sheets. Thus, the benefit can be appropriately granted to the user.

In addition, the server 200 preferentially updates the number of non-charged print sheets until the number of non-charged print sheets reaches the upper limit number of print sheets. Thus, user convenience is improved.

In addition, the server 200 updates the non-charged sheet information only when the current date and time is not past the time limit represented by the time limit information. Thus, the benefit can be properly granted to the user.
(Case C; FIG. 5)

Referring to FIG. 5, Case C in which the total number of print sheets when the charging process is executed exceeds the number of contracted print sheets will be described. The initial state of Case C is the same as the initial state of Case B in FIG. 4.

T210 is the same as T110 in FIG. 4. That is, after T210, the serial number SN1, the total sheet information "100", the non-charged sheet information "100", the upper limit sheet information "200", the time limit information "2022/11/30 23:59", the excess sheet information "0", the carryover sheet information "0" and the contract sheet information "1000" are stored in association with each other in the management information MI1 in the management table 242.

The server 200 executes the first update process when it receives the printing information including the serial number SN1 and the printer sheet information "1500" from the printer 10 at T220. The current date and time at T220 is "2022/11/30 12:00". The server 200 adds the number of printer print sheets "1500" represented by the printer sheet information to the total number of print sheets "100" represented by the total sheet information in the management information MI1. Next, the server 200 determines that the current date and time "2022/11/30 12:00" is not past the time limit "2022/11/30 23:59" represented by the time limit information in the management information MI1, and executes the process to update the non-charged sheet information. The server 200 calculates the added number of print sheets "1600" by adding the number of printer print sheets "1500" to the number of non-charged print sheets "100" represented by the non-charged sheet information in the management information MI1, and determines that the added number of print sheets "1600" exceeds the upper limit number of print sheets "200" represented by the upper limit sheet information in the management information MI1. In this case, the server 200 stores the number of non-charged print sheets "200" in the management information MI1 as the non-charged sheet information. Next, the server 200 calculates the number of charged print sheets "1400" by subtracting the number of non-charged sheets "200" and the number of carryover print sheets "0" represented by the carryover sheet information in the management information MI1 from the total number of print sheets "1600", determines that the number of charged print sheets "1400" exceeds the number of contracted print sheets "1000", and executes a process to update the excess sheet information in the management information MI1. The server 200 stores the number of print sheets "400" obtained by subtracting the number of contracted print sheets "1000" from the number of charged print sheets "1400" in the management information MI1 as the excess sheet information.

When the current date and time becomes "2022/12/1 00:00", the server 200 executes the charging process at T230. First, the server 200 executes the process of outputting the number of charged print sheets. The server 200 calculates the number of charged print sheets "1400" by subtracting the number of non-charged print sheets "200" and the number of carryover print sheets "0" from the total number of print sheets "1600", and outputs the number of charged print sheets "1400". In the present case, since the number of charged print sheets "1400" exceeds the number of contracted print sheets "1000", the administrator executes the process to charge a total fee of the flat-rate fee and an excess fee corresponding to the number of print sheets "400" that exceeds the number of contracted print sheets "1000".

Next, the server 200 executes the process of updating the management information MI1. The server 200 resets the total number of print sheets in the management information MI1. The server 200 deletes the benefit information including the time limit information indicating the time limit "2022/11/30 11:59" from the management information MI1 because the current date and time "2022/12/1 00:00" is past the time limit "2022/11/30 23:59". The server 200 does not update the carryover sheet information because the number of charged print sheets "1400" exceeds the number of contracted print sheets "1000".

(Case D; FIG. 6)

Referring to FIG. 6, Case D in which a sheet information screen is displayed on the terminal device 100 is described. The initial state of Case D is after T120 of Case B in FIG. 4. That is, in the management information MI1 in the management table 242, the serial number SN1, the total sheet information "600", the non-charged sheet information "200", the upper limit sheet information "200", the time limit information "2022/11/30 23:59", the excess sheet information "0", the carryover sheet information "0", the contract sheet information "1000" are stored in association with each other.

T310 to T328 are the same as T10 to T28 in FIG. 3. When the terminal device 100 accepts a sheet information request operation requesting sending of sheet information screen data at T330, the terminal device 100 sends a sheet information request to the server 200 at T332.

When the server 200 receives the sheet information request from the terminal device 100 at T332, the server 200 identifies the username U1 of the logged-in user and identifies the serial number SN1 associated with the identified username U1 in the user table 238. Next, the server 200 identifies the management information MI1 including the identified serial number SN1 in the management table 242. Next, at T340, the server 200 sends to the terminal device 100 the sheet information screen data including the total sheet information "600", the non-charged sheet information "200", the carryover sheet information "0", and the excess sheet information "0" in the management information MI1.

When the terminal device 100 receives the sheet information screen data from the server 200 at T340, the terminal device 100 displays the sheet information screen represented by the sheet information screen data at T342. The sheet information screen includes the total number of print sheets "600" represented by the total sheet information, the number of non-charged print sheets "200" represented by the non-charged sheet information, the number of carryover print sheets "0" represented by the carryover sheet information, and the number of excess print sheets "0" represented by the excess sheet information. Consequently, the user can see the respective numbers of print sheets.

(Effects of Case D)

When the server 200 receives the sheet information request from the terminal device 100 (T332 in FIG. 6), the server 200 sends the non-charged sheet information to the terminal device 100 (T340). Thus, the user of the terminal device 100 can see the number of non-charged print sheets represented by the non-charged sheet information. Thus, user convenience is improved.

When the server 200 receives the sheet information request from the terminal device 100 (T332 in FIG. 6), the server 200 sends the non-charged sheet information and the total sheet information to the terminal device 100 (T340). Thus, the user of the terminal device 100 can see the total number of print sheets represented by the total sheet information. Thus, user convenience is further improved.

(Corresponding Relationships)

The serial number is an example of "printer identification information". The non-charged sheet information in T340 of FIG. 6 is an example of "related sheet information".

The processes executed at T110 and T120 in FIG. 4 are examples of "update the non-charged sheet information in the memory". T340 in FIG. 6 is an example of "send to the terminal device related sheet information related to the non-charged sheet information in the memory".

Second Embodiment

In the communication system 2 of the present embodiment, information stored in the management table 242 of the server 200 differs from that in the first embodiment. In the following, the same reference signs will be given to the configurations that are common between the embodiments and the explanations thereof will be omitted.

As shown in FIG. 7, in the management table 242 of the present embodiment, the serial number, the total sheet information, the benefit information, the excess sheet information, the carryover sheet information, and the contract sheet information are stored in association with each other. The benefit information includes the remaining sheet information, the upper limit sheet information, and the time limit information.

The remaining sheet information indicates the number of remaining print sheets for which the fee is not charged.

(Case E; FIG. 8)

Referring to FIG. 8, Case E in which the total number of print sheets when the charging process is executed is less than the number of contracted print sheets will be described. The initial state of Case E is the state after Case A in FIG. 3. That is, the serial number SN1, the total sheet information "0", the remaining sheet information "200", the upper limit sheet information "200", the time limit information "2022/11/30 23:59", the excess sheet information "0", the carryover sheet information "0", and the contract sheet information "1000" are stored in the management table 242 in association with each other. Immediately after the benefit code "AAA" (see T50 in FIG. 3) is inputted, the number of remaining print sheets represented by the remaining sheet information and the upper limit number of print sheets represented by the upper limit sheet information are identical.

At T410, the server 200 receives, from the printer 10, the printing information including the serial number SN1 and the printer sheet information "100". The current date and time at T410 is "2022/11/29 12:00". The server 200 identifies, in the management table 242, the management information MI11 including the serial number SN1 in the printing information and executes a second update process to update the management information MI11. First, the server 200 adds the number of printer print sheets "100" to the total number of print sheets "0" represented by the total sheet information in the management information MI11. Next, the server 200 identifies the time limit "2022/11/30 11:59" represented by the time limit information in the management information MI11, determines that the current date and time "2022/11/29 12:00" is not past the time limit "2022/11/30 11:59", and executes a process to update the remaining sheet information in the management information MI11. The server 200 calculates the subtracted number of print sheets "100" by subtracting the printer print sheets "100" from the number of remaining print sheets "200" represented by the remaining sheet information, and determines whether the subtracted number of print sheets "100" is greater than or equal to zero. The server 200 determines that the subtracted number of print sheets "100" is greater than or equal to zero, and stores the subtracted number of print sheets "100" as the remaining sheet information. If the current date and time is past the time limit "2022/12/1 00:00", the server 200 does not execute the process of updating the remaining sheet information. Next, the server 200 calculates the number of non-charged print sheets "100", which is the number of print sheets for which the fee is not charged, by subtracting the number of remaining print sheets "100" from the upper limit number of print sheets "200". The server 200 subtract the number of non-charged print sheets "100" and the number of carryover print sheets "0" represented by the carryover sheet information in the management information MI11 from the total number of prints sheets "100" to calculate the number of charged print sheets "0", and determines whether the number of charged print sheets "0" exceeds the number of contracted print sheets "1000" represented by the contract sheet information. The server 200 determines that the number of charged print sheets "0" does not exceed the number of contracted print sheets "1000". In this case, the server 200 does not update the excess sheet information in the management information MI11. When the server 200 determines that the number of charged print sheets exceeds the number of contracted print sheets, the server 200 updates the excess sheet information in the management information MI11. This process will be explained in detail later. As described above, the server 200 updates the management information MI11 every time the printing information is received.

At T420, the server 200 receives from the printer 10 the printing information including the serial number SN1 and the number of print sheets "500". The current date and time at T420 is "2022/11/30 12:00". The server 200 executes the second update process to update the total sheet information and the remaining sheet information in the management table 242 to "600" and "0", respectively.

When the current date and time becomes "2022/12/1 00:00", the server 200 executes the charging process using the management information MI11 in the management table 242 at T430. The contents of the charging process are the same as those of the charging process in the first embodiment. Since the current date and time "2022/12/1 00:00" is past the time limit "2022/11/30 23:59", the server 200 deletes the benefit information including the time limit information indicating the time limit "2022/11/30 23:59" from the management information MI11. Next, the server 200 executes the second update process to update the total sheet information and the carryover sheet information in the management information MI11 to "0" and "600", respectively. When the number of remaining print sheets has not reached zero and the current date and current time and date is not past the time limit, the server 200 stores the number of remaining print sheets in the management table 242 as the new upper limit sheet information.

As described above, the server 200 outputs the number of print sheets obtained by subtracting the number of non-charged print sheets from the total number of print sheets as the number of charged print sheets. Thus, the benefit can be appropriately granted to the user.

In addition, the server 200 preferentially updates the number of remaining print sheets until the subtracted number of print sheets reaches zero. Thus, user convenience is improved.

In addition, the server 200 updates the remaining sheet information only when the current date and time is not past the time limit represented by the time limit information. Thus, the benefit can be appropriately granted to the user.
(Case F; FIG. 9)

Referring to FIG. 9, Case F in which the total number of print sheets when the charging process is executed exceeds the number of contracted print sheets will be described. The initial state of Case F is the same as the initial state of Case E in FIG. 8.

T510 is the same as T410 in FIG. 8. That is, after T510, in the management information MI11 in the management table 242, the serial number SN1, the total sheet information "100", the remaining sheet information "100", the upper limit sheet information "200", the time limit information "2022/11/30 23:59", the excess sheet information "0", the carryover sheet information "0" and the contract sheet information "1000" are stored in association with each other.

At T520, the server 200 receives, from the printer 10, the printing information including the serial number SN1 and the printer sheet information "1500". The current date and time at T520 is "2022/11/30 12:00". In this case, the server 200 executes the second update process. The server 200 calculates the subtracted number of print sheets "−1400" by subtracting the number of printer print sheets "1500" from the number of remaining print sheets "100" represented by the remaining sheet information. The server 200 determines that the subtracted number of print sheets "−1400" is less than zero and stores "0 (zero)" as the remaining sheet information. In addition, the server 200 updates the total sheet information and the excess sheet information in the management information MI11 to "1600" and "400", respectively.

When the current date and time becomes "2022/12/1 00:00", the server 200 executes the charging process at T530. The contents of the charging process at T530 are the same as those of the charging process at T230 in FIG. 5. Next, the server 200 executes the second update process to delete the benefit information including the time limit information indicating the time limit "2022/11/30 23:59" from the management information MI11 and update the total sheet information and the excess sheet information in the management information MI11 to "0" and "0," respectively.
(Case G; FIG. 10)

Referring to FIG. 10, Case G in which the sheet information screen is displayed on the terminal device 100 will be described. The initial state of Case G is after T420 of Case E in FIG. 8. That is, in the management information MI11 of the management table 242, the serial number SN1, the total sheet information "600", the remaining sheet information "0", upper limit sheet information "200", the time limit information "2022/11/30 23:59", the excess sheet information "0", the carryover sheet information "0", the contract sheet information "1000" are stored in association with each other.

T610 to T632 are the same as T310 to T332 in FIG. 6.

At T632, when the server 200 receives the sheet information request from the terminal device 100, the server 200 identifies, in the management table 242, the management information MI11 including the identified serial number SN1. Next, at T640, the server 200 sends, to the terminal device 100, the sheet information screen data including the total sheet information "600", the remaining sheet information "0", the carryover sheet information "0", and the excess sheet information "0" in the management information MI11.

When the terminal device 100 receives the sheet information screen data from the server 200 at T640, the terminal device 100 displays the sheet information screen represented by the sheet information screen data at T642. The sheet information screen includes the total number of print sheets "600" represented by the total sheet information, the number of remaining print sheets "0" represented by the remaining sheet information, the number of carryover print sheets "0" represented by the carryover sheet information, and the number of excess print sheets "0" represented by the excess sheet information. Consequently, the user can see the respective numbers of print sheets.

(Effects of Case G)

When the server 200 receives the sheet information request from the terminal device 100 (T632 in FIG. 10), the server 200 sends the remaining sheet information to the terminal device 100 (T640). Thus, the user of the terminal device 100 can see the number of remaining print sheets represented by the remaining sheet information. Consequently, user convenience is improved.

When the server 200 receives the sheet information request from the terminal device 100 (T632 in FIG. 10), the server 200 sends the remaining sheet information and the total sheet information to the terminal device 100 (T640). Thus, the user of the terminal device 100 can see the total number of print sheets represented by the total sheet information. Consequently, user convenience is further improved.

The processes executed at T410 and T420 in FIG. 8 are examples of the process "update the remaining sheet information in the memory". T640 in FIG. 10 is an example of the process "send to the terminal device the remaining sheet information in the memory".

Third Embodiment

The communication system 2 of the present embodiment differs from the communication system 2 of the first and second embodiments in that the printer 10 stores the sheet table 40 as shown in FIG. 1. In addition, the information in the management table 242 of the server 200 differs from the first and second embodiments.

As shown in FIG. 11, the total number of print sheets and the benefit information are stored in association with each other in the sheet table 40 of the printer 10. The benefit information includes the non-charged sheet information, the upper limit sheet information, and the time limit information.

As shown in FIG. 2, in the present embodiment, the management table 242 of the server 200 does not include the total sheet information or the benefit information. In a modification, the management table 242 may include the total sheet information and the benefit information.

(Specific Case H)

Figure 12:
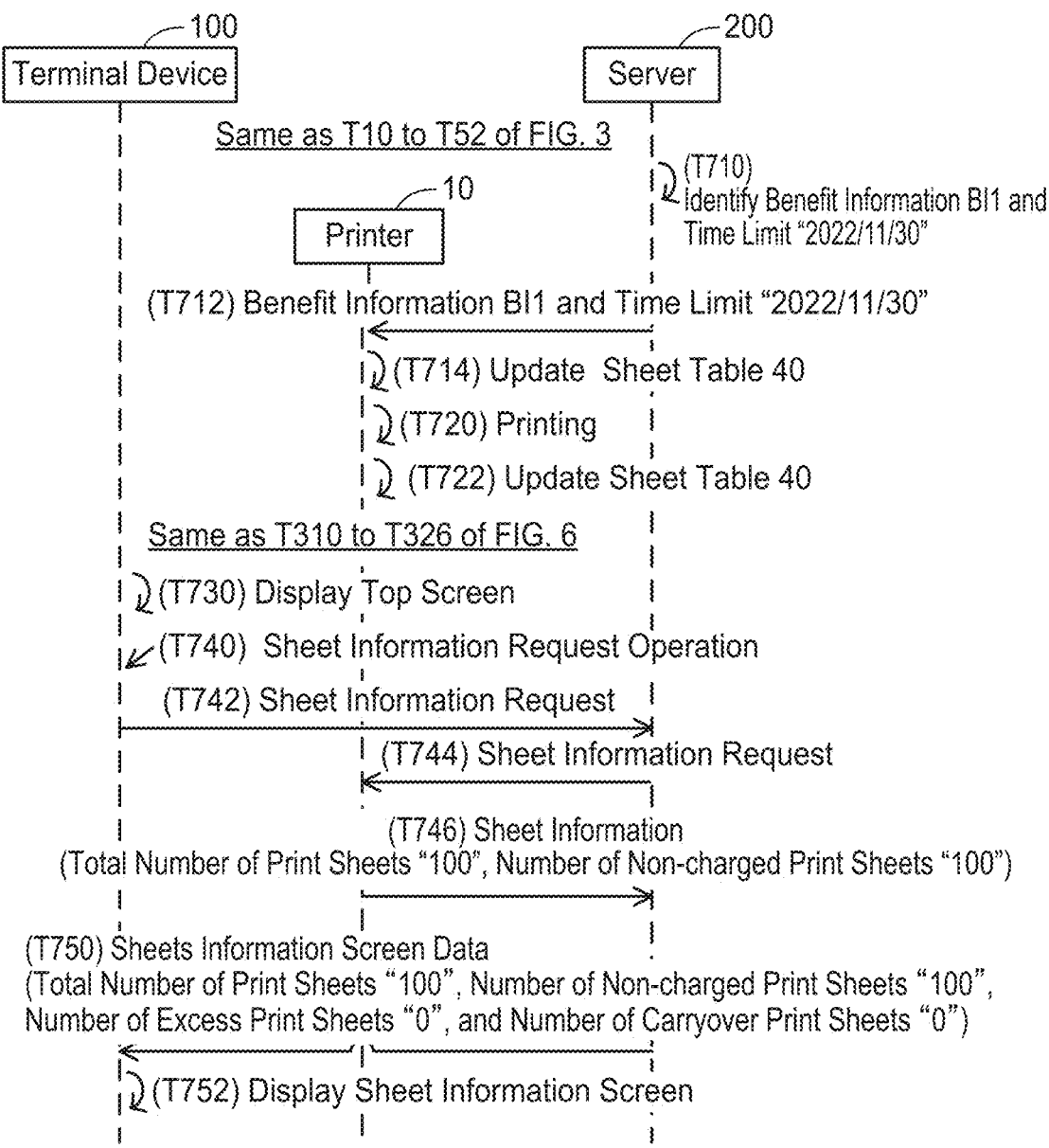
FIG. 12 shows a sequence diagram of Case H in which the sheet information screen is displayed on the terminal device in the third embodiment.

Referring to FIG. 12, the specific Case H executed by the communication system 2 of the present embodiment will be described. The initial state of Case H is immediately after the user of the printer 10 subscribes to the flat-rate service.

First, the same processes as T10 to T52 in FIG. 3 is executed between the terminal device 100 and the server 200. In this case, at T710, the server 200 identifies the benefit sheet information BI1 "200" and the time limit information "2022/11/30 23:59" in the benefit table 240. At T712, the server 200 sends the identified benefit sheet information BI1 "200" and the identified time limit information "2022/11/30 23:59" to the printer 10.

At T712, when the printer 10 receives the benefit sheet information BI1 "200" and the time limit information "2022/11/30 23:59" from the server 200, the printer 10 updates the sheet table 40. Specifically, the printer 10 stores the number of benefit print sheets "200" represented by the benefit sheet information BI1 in the sheet table 40 as the upper limit sheet information, and also stores the time limit information "2022/11/30 23:59" in the sheet table 40.

The printer 10 executes printing at T720. In the present case, a situation where 100 sheets of print media are used is assumed. In this case, the printer 10 executes a third update process to update the sheet table 40 at T722. In the third update process, the total sheet information and the non-charged sheet information in the sheet table 40 are updated in the same way as in the first update process of the first embodiment. In the present case, the total sheet information and the non-charged sheet information are updated to "100" and "100", respectively.

Next, the same processes as T310 to T326 in FIG. 6 is executed between the terminal device 100 and the server 200. In this case, the terminal device 100 displays a top screen at T730. T740 and T742 are the same as T330 and T332 in FIG. 6, respectively.

When the server 200 receives the sheet information request from the terminal device 100 at T742, the server 200 sends the sheet information request to the printer 10 at T744. When the printer 10 receives the sheet information request from the server 200 at T744, the printer 10 identifies the total sheet information "100" and the non-charged sheet information "100" in the sheet table 40. At T746, the printer 10 sends to the server 200 the sheet information including the identified total sheet information "100" and the identified non-charged sheet information "100".

When the server 200 receives the sheet information from the printer 10 at T746, the server 200 uses the sheet information to update the excess sheet information in the management table 242. T750 and T752 are the same as T340 and T342 in FIG. 6, respectively.

The server 200 executes the charging process, for example, when the current date and time becomes "2022/12/1 00:00". In the charging process, the server 200 sends a charging information request to the printer 10. When the printer 10 receives the charging information request from the server 200, the printer 10 sends the total sheet information and the non-charged sheet information to the server 200. In addition, the printer 10 resets the total sheet information in the sheet table 40. When the current date and time is not past the time limit, the printer 10 deletes the benefit information from the sheet table 40, and when the number of non-charged print sheets does not reach the upper limit number of print sheets and the current date and time is not past the time limit, the printer 10 subtracts the number of non-charged print sheets from the upper limit number of print sheets and store the obtained number of print sheets in the sheet table 40 as the new upper limit sheet information and resets the non-charged sheet information. The server 200 executes the charging process using the total sheet information and the non-charged sheet information received from the printer 10 and the management table 242. The contents of the charging process are the same as those of the charging process in the first embodiment.

Effects of Present Embodiment

As described above, when the server 200 receives the sheet information request from the terminal device 100 (T742 in FIG. 12), the server 200 sends the non-charged sheet information to the terminal device 100 (T750). Thus, the user of the terminal device 100 can see the number of non-charged print sheets represented by the non-charged sheet information. Thus, user convenience is improved.

The memory 34 of the printer 10 is an example of the "printer memory". T722 in FIG. 12 is an example of a process "update the non-charged sheet information in the printer memory" executed by the "printer". T746 in FIG. 12 is an example of a process "send the non-charged sheet information and printer identification information for identifying the printer to the server" executed by the "printer". T746 in FIG. 12 is an example of the process "receive the non-charged sheet information and the printer identification information from the printer" executed by the "server". T750 in FIG. 12 is an example of a process "send to the terminal device related sheet information related to the received non-charged sheet information" executed by the "server".

Fourth Embodiment

In the communication system 2 of the present embodiment, as shown in FIG. 11, the information in the sheet table 40 of the printer 10 is different from that in the third embodiment.

As shown in FIG. 11, the total sheet information and the benefit information are stored in association with each other in the sheet table 40 of the present embodiment. The benefit information includes the remaining sheet information, the upper limit sheet information, and the time limit information.

(Specific Case I)

Figure 13:
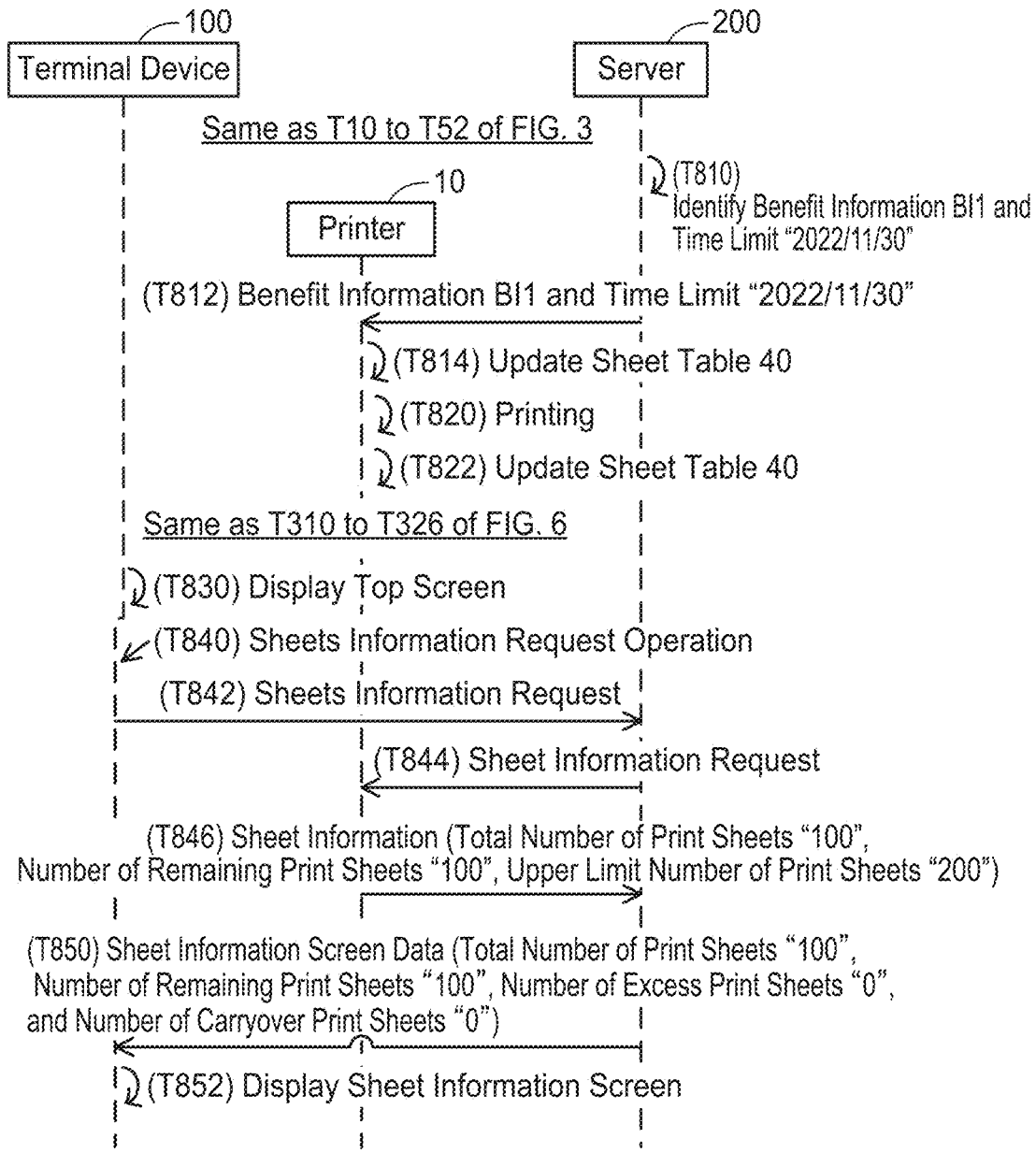
FIG. 13 shows a sequence diagram of Case I in which the sheet information screen is displayed on the terminal device in the fourth embodiment.

Referring to FIG. 13, a specific Case I executed by the communication system 2 of present embodiment will be described. The initial state of Case I is the same as the initial state of Case H in FIG. 12.

First, the same processes as T10 to T52 in FIG. 3 are executed between the terminal device 100 and the server 200. T810 to T814 and T820 are to the same as T710 to T714 and T720 in FIG. 12, respectively. At T822, the printer 10 executes a fourth update process to update the sheet table 40. In the fourth update process, the total sheet information and the remaining sheet information in the sheet table 40 are updated in the same manner as in the second update process of the second embodiment. In the present case, the total sheets information and the remaining sheet information are updated to "100" and "100", respectively.

Next, the same processes as T310 to T326 in FIG. 6 are executed between the terminal device 100 and the server 200. T830 and T840 to T844 are the same as T730 and T740 to T744 in FIG. 12, respectively.

At T844, when the printer 10 receives the sheet information request from the server 200, the printer 10 identifies the total sheet information "100", the non-charged sheet information "100", and the upper limit sheet information "200" in the sheet table 40. At T846, the printer 10 sends the sheet information including the identified total sheet information "100", the identified non-charged sheet information "100", and identified upper limit sheet information "200" to the server 200.

When the server 200 receives the sheet information from the printer at T846, the server 200 uses the information in the sheet information to update the excess sheet information in the management table 242. T850 and T852 are the same as T740 and T742 in FIG. 12, respectively.

The server 200, for example, executes the charging process when the current date and time becomes "2022/12/1 00:00". In the charging process, the server 200 sends the charging information request to the printer 10. When the printer 10 receives the charging information request from the server 200, the printer 10 sends the total sheet information, the non-charged sheet information, and the upper limit sheet information to the server 200. Further, the printer 10 also resets the total sheet information in the sheet table 40. The server 200 executes the charging process using the total sheets information, the non-charged sheet information, and the upper limit sheet information received from the printer 10 and the management table 242. The contents of the charging process are the same as those of the charging process of the second embodiment. When the current date and time is not past the time limit, the printer 10 deletes the benefit information from the sheet table 40, and when the number of remaining print sheets has not reached zero and the current date and time is not past the time limit, the printer 10 stores the number of remaining print sheets in the management table 242 as the new upper limit sheet information.

Effects of Case I

When the server 200 receives the sheet information request from the terminal device 100 (T842 in FIG. 13), the server 200 sends the remaining sheet information to the terminal device 100 (T850). Thus, the user of the terminal device 100 can see the number of remaining print sheets represented by the remaining sheet information. Thus, user convenience is improved.

T822 in FIG. 13 is an example of "update the remaining sheet information in the memory" executed by the "printer". T846 in FIG. 13 is an example of "send the remaining sheet information and printer identification information for identifying the printer to the server" executed by the "printer". T846 in FIG. 13 is an example of "receive the remaining sheet information and the printer identification information from the printer" executed by the "server". T850 in FIG. 13 is an example of "send to the terminal device the received remaining sheet information" executed by "server".

(First Modification) The server 200 may be configured of a single server or may include multiple servers. For example, the server 200 may include a first server and a second server. In this modification, the first server receives the printing information from the printer 10 and sends the received printing information to the second server.

(Second Modification) The sheet information screen data in T340 of FIGS. 6 and T750 of FIG. 12 may not include the total sheet information or the like.

(Third Modification) The sheet information screen data in T340 of FIG. 6 may include the upper limit sheet information and the non-charged sheet information. In another modification, the sheet information screen data may include, instead of the non-charged sheet information, sheet difference information indicating a difference between the upper limit number of print sheets represented by the upper limit sheet information and the number of non-charged print sheets represented by the non-charged sheet information.

(Fourth Modification) In the first embodiment, the server 200 may be configured to update the non-charged sheet information when the total number of print sheets exceeds the number of contracted print sheets. In another modification, in the third embodiment, the printer 10 may be configured to update the non-charged sheet information when the total number of print sheets exceeds the number of contracted print sheets. In this modification, the printer 10 receives the contract sheet information from the server 200.

(Fifth Modification) In the second embodiment, the printer 10 may be configured to update the remaining sheet information when the total number of print sheets exceeds the number of contracted print sheets. In another modification, in the fourth embodiment, the printer 10 may be configured to update the remaining sheet information when the total number of print sheets exceeds the number of contracted print sheets. In this modification, the printer 10 receives the contract sheet information from the server 200.

(Sixth Modification) The benefit table 240 and the management table 242 of the first and second embodiments may not store the time limit information. In another modification, the benefit table 240 and the sheet table 40 of the third and fourth embodiments may not store the time limit information.

(Seventh Modification) The server 200 may be configured to store the benefit information (i.e., the upper limit sheet information and the time limit information) when a period for which the user has been subscribed to the flat-rate service reaches one year.

(Eighth Modification) In the first and second embodiments, two or more pieces of benefit information may be stored in the management table 242 of the server 200. In this case, the server 200 will preferentially update the non-charged sheet information or the remaining sheet information in the benefit information that is closer to the time limit. In the third and fourth embodiments, two or more pieces of benefit information may be stored in the sheet table 40 of the printer 10. In this case, the printer 10 preferentially updates the non-charged sheet information or the remaining sheet information in the benefit information that is closer the time limit.

(Ninth modification) In the above embodiments, the processes of FIGS. 3 to 6, FIGS. 8 to 10, FIG. 12, and FIG. 13 are implemented by a software (e.g., the program 36, 236), however, at least one of these processes may be implemented by hardware such as a logic circuit.

What is claimed is:

1. A non-transitory computer-readable recording medium storing computer-readable instructions for a server,
   the server being configured to provide a service to charge a user of a printer a fee depending on a number of sheets of print media printed by the printer,
   the server comprising:
   a memory configured to store printer identification information for identifying the printer and sheet information of the printer in a specific period in association with each other, the sheet information includes upper limit sheet information indicating an upper limit number of print sheets for which the fee is not charged and non-charged sheet information indicating a number of non-charged print sheets for which the fee is not charged; and
   a processor,
   wherein the computer-readable instructions, when executed by the processor, cause the server to:
   every time printing information indicating a number of printer print sheets which is a number of sheets printed by the printer is received from the printer, update the non-charged sheet information in the memory within a range that does not exceed the upper limit number of print sheets, the number of printer print sheets being a number of sheets of the print media used for the printing by the printer from when previous printing information is sent to the server until when present printing information is sent to the server; and
   in a case where a sheet information request including the printer identification information is received from a terminal device, send to the terminal device related sheet information related to the non-charged sheet information in the memory.

2. The non-transitory computer-readable recording medium as in claim 1, wherein
   the sheet information further includes total sheet information indicating a total number of print sheets printed by the printer in the specific period,
   wherein in a case where the sheet information request is received from the terminal device, the related sheet information and the total sheet information are sent to the terminal device.

3. The non-transitory computer-readable recording medium as in claim 2, wherein
   the computer-readable instructions, when executed by the processor, further cause the server to:
   output a number of print sheets obtained by subtracting the number of non-charged print sheets from the total number of print sheets as a number of charged print sheets for which the fee is charged.

4. The non-transitory computer-readable recording medium as in claim 1, wherein
   the related sheet information is the non-charged sheet information.

5. The non-transitory computer-readable recording medium as in claim 1, wherein
   in a case where an added number of print sheets obtained by adding the number of printer print sheets indicated by the received printing information to the number of non-charged print sheets is not larger than the upper limit number of print sheets, the added number of print sheets is stored as the non-charged sheet information, and
   in a case where the added number of print sheets is larger than or equal to the upper limit number of print sheets, the upper limit number of print sheets is stored as the non-charged sheet information.

6. The non-transitory computer-readable recording medium as in claim 1, wherein
   the memory is further configured to store time limit information indicating a time limit to update the number of non-charged print sheets in association with the printer identification information,
   wherein in a case where a current date and time is not past the time limit, the non-charged sheet information in the memory is updated, and
   in a case where the current date and time is past the time limit, the non-charged sheet information in the memory is not updated.

7. The non-transitory computer-readable recording medium as in claim 1, wherein
   the memory is further configured to store a benefit code and the upper limit sheet information in association with each other,
   the computer-readable instructions, when executed by the processor, further cause the server to:
   in a case where the printer identification information and the benefit code are received from the terminal device, store, in the memory, the upper limit number of print sheets in association with the printer identification information, the upper limit number of print sheets being stored in the memory in association with the received benefit code.

8. The non-transitory computer-readable recording medium as in claim 7, wherein
   the benefit code is a coupon code generated by the server.

9. A non-transitory computer-readable recording medium storing computer-readable instructions for a server,
   the server being configured to provide a service to charge a user of a printer a fee depending on a number of sheets of print media printed by the printer,
   the server comprising:
   a memory configured to store printer identification information for identifying the printer and sheet information of the printer in a specific period in association with each other, the sheet information includes remaining sheet information indicating a number of remaining print sheets for which the fee is not charged; and a processor, wherein the computer-readable instructions, when executed by the processor, cause the server to:

every time printing information indicating a number of printer print sheets which is a number of sheets printed by the printer is received from the printer, update the remaining sheet information in the memory within a range that does not decrease the number of remaining print sheets to below zero, the number of printer print sheets being a number of sheets of the print media used for the printing by the printer from when previous printer printing information is sent to the server until when present printer printing information is sent to the server; and in a case where a sheet information request including the printer identification information is received from a terminal device, send to the terminal device the remaining sheet information in the memory.

10. The non-transitory computer-readable recording medium as in claim 9, wherein the sheet information further includes total sheet information indicating a total number of print sheets printed by the printer in the specific period, wherein in a case where the sheet information request is received from the terminal device, the remaining sheet information and the total sheet information are sent to the terminal device.

11. The non-transitory computer-readable recording medium as in claim 10, wherein the sheet information further includes upper limit sheet information indicating an upper limit number of print sheets for which the fee is not charged, and the computer-readable instructions, when executed by the processor, further cause the server to:

calculate a number of non-charged print sheets by subtracting the number of remaining print sheets from the upper limit number of print sheets, the number of non-charged print sheets being a number of print sheets for which the fee is not charged, and output a number of print sheets obtained by subtracting the number of non-charged print sheets from the total number of print sheets as a number of charged print sheets for which the fee is charged.

12. The non-transitory computer-readable recording medium as in claim 9, wherein in a case where a subtracted number of print sheets obtained by subtracting the number of printer print sheets indicated by the received printing information from the number of remaining print sheets is not smaller than zero, the subtracted number of print sheets is stored as the remaining sheet information, and in a case where the subtracted number of print sheets is smaller than or equal to zero, zero is stored as the remaining sheet information.

13. The non-transitory computer-readable recording medium as in claim 9, wherein the memory is further configured to store time limit information indicating a time limit to update the number of remaining print sheets in association with the printer identification information, wherein in a case where a current date and time is not past the time limit, the remaining sheet information in the memory is updated, and in a case where the current date and time is past the time limit, the remaining sheet information in the memory is not updated.

14. The non-transitory computer-readable recording medium as in claim 9, wherein the memory is further configured to store a benefit code and upper limit sheet information indicating an upper limit number of print sheets for which the fee is not charged in association with each other, the computer-readable instructions, when executed by the processor, further cause the server to:

in a case where the printer identification information and the benefit code are received from the terminal device, store the upper limit number of print sheets in the memory as the remaining sheet information in association with the printer identification information, the upper limit number of print sheets being stored in the memory in association with the received benefit code.

15. The non-transitory computer-readable recording medium as in claim 14, wherein the benefit code is a coupon code generated by the server.

16. A communication system comprising:

a printer; and a server configured to provide a service to charge a user of a printer a fee depending on a number of sheets of print media printed by the printer, wherein the printer comprises:

a printer memory configured to store sheet information of the printer in a specific period, the sheet information including upper limit sheet information indicating an upper limit number of print sheets for which the fee is not charged and non-charged sheet information indicating a number of non-charged print sheets for which the fee is not charged; and a controller configured to:

every time printing is executed, update the non-charged sheet information in the printer memory within a range that does not exceed the upper limit number of print sheets; and send the non-charged sheet information and printer identification information for identifying the printer to the server, wherein the server comprises:

a controller configured to:

receive the non-charged sheet information and the printer identification information from the printer; and in a case where a sheet information request including the printer identification information is received from a terminal device, send to the terminal device related sheet information related to the received non-charged sheet information.

17. A communication system comprising:

a printer; and a server configured to provide a service to charge a user of the printer a fee depending on a number of print media printed by the printer, wherein the printer comprises:

a printer memory configured to store sheet information of the printer in a specific period, the sheet information includes remaining sheet information indicating a number of remaining print sheets for which the fee is not charged; and a controller configured to:

every time printing is executed, update the remaining sheet information in the memory within a range that does not decrease the number of remaining print sheets to below zero; and send the remaining sheet information and printer identification information for identifying the printer to the server, wherein the server comprises:

a controller configured to:

receive the remaining sheet information and the printer identification information from the printer, and in a case where a sheet information request including the printer identification information is received from a terminal device, send to the terminal device the received remaining sheet information.

\* \* \* \* \*